March 12, 1957  E. M. WILLIAMS  2,785,279
APPARATUS FOR ELECTRICALLY ERODING MATERIALS
Filed March 24, 1954  3 Sheets-Sheet 1

Inventor
Everard M. Williams
Carlson, Pitzner, Hubbard, & Wolfe
Atty's

March 12, 1957 E. M. WILLIAMS 2,785,279
APPARATUS FOR ELECTRICALLY ERODING MATERIALS
Filed March 24, 1954 3 Sheets-Sheet 2

Inventor
Everard M. Williams
Carlson, Pitzner, Hubbard, & Wolfe
Atty's

March 12, 1957 E. M. WILLIAMS 2,785,279
APPARATUS FOR ELECTRICALLY ERODING MATERIALS
Filed March 24, 1954 3 Sheets-Sheet 3

Inventor
Everard M. Williams
Carlson, Pitzner, Hubbard & Wolfe
Attys

United States Patent Office 2,785,279
Patented Mar. 12, 1957

2,785,279

APPARATUS FOR ELECTRICALLY ERODING MATERIALS

Everard M. Williams, Pittsburgh, Pa., assignor, by mesne assignments, to Firth Sterling Inc., Pittsburgh, Pa., a corporation of Pennsylvania Application March 24, 1954, Serial No. 418,468

19 Claims. (Cl. 219—69)

This invention relates to apparatus for electrically dislodging particles from a conductive workpiece by a series of short, time-spaced spark discharges, the art of so removing materials being sometimes termed as "spark erosion" or "spark machining."

This application is a continuation in part of my previous and now abandoned applications, Serial No. 201,657, filed December 19, 1950, and Serial No. 215,990, filed March 6, 1951.

Spark erosion or machining has found particular utility for machining extremely hard materials such as tungsten and other carbides, hard steel alloys and the like. In boring operations, in tungsten carbide particularly, this method has been proven many times faster than the conventional machining methods using diamonds or diamond dust and has made possible machining operations which could not be otherwise performed. Various other advantages are inherent in this type of machining, one being freedom from heat treatment problems as the workpiece is not materially heated by the spark machining nor is the spark machining effectiveness affected by the state of heat treatment of the workpiece. Another is the simplicity and inexpensive construction of the shaping tool since it serves merely as a non-contacting electrode while the sparks do the work of removing workpiece particles or chips.

The inherent advantages of the spark machining process emphasize the problem of improving spark machining apparatus for better realizing those advantages. While higher current sparks at a greater repetition rate are desired for faster cutting, it also is desired that the cost and maintenance of the apparatus should not be unduly increased. One drawback in realizing this is the fact that the physical embodiments of the spark discharge circuits present such substantial reactance to the required rapid current changes as to prevent effective utilization of otherwise available spark machining energy.

It is therefore an object of my invention to provide an improved spark machining apparatus.

It is another object of my invention to provide a relatively simple and inexpensive spark machining apparatus capable of improved speed.

It is another object of my invention to provide a spark discharge circuit for more effectively utilizing the electrical energy available from the spark powering means.

It is a still further object of my invention to provide a physical arrangement of the spark discharge circuit for improving its electrical characteristics.

The objects of the invention thus generally set forth, together with other objects and ancillary advantages are attained by the construction and arrangement shown by way of illustration in the accompanying drawings, in which.

Figure 1:
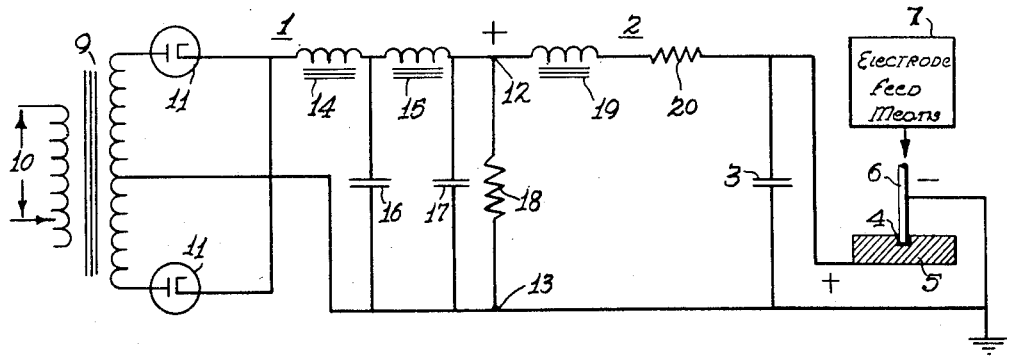
Fig. 1 is a circuit diagram of the charging and discharging circuit for use in a typical apparatus embodying my invention.

While the invention is susceptible of various modifications and alternative constructions, there is shown in the drawings and will herein be described in detail certain preferred embodiments, but it is to be understood that it is not thereby intended to cover all modifications, equivalents, and alternative constructions falling within the spirit and scope of the invention as expressed in the appended claims.

A better understanding of the operational requirements of spark machining apparatus generally and of the novel and distinctive manner in which those requirements are met by my invention as particularly described hereinafter may be gained by first considering the general arrangement of spark machining circuits together with the theory and operation of spark machining.

Referring first to the general organization of spark machine apparatus, it may be seen from the circuit diagram of Fig. 1 that such an apparatus in simplified version comprises a direct current voltage supply 1 which is connected through a charging network 2 to a storage circuit indicated for the purposes of general explanation as a capacitor 3. These represent the basic components of the charging circuit. A discharge circuit is provided by the cooperation of the capacitor 3 with a spark gap 4 connected across the terminals of the storage capacitor 3, the spark gap being defined between a surface of a workpiece 5 and the facing surface or surfaces of a spark machining electrode tool 6. The electrode is provided with controlled translational or rotational motion or both with respect to the workpiece by an electrode feed system represented schematically at 7. The spark gap is connected to the capacitor 3 in such a way that the workpiece 5 is the anode or positive electrode and the tool is the cathode or negative electrode of the discharge circuit. This generalized circuit corresponds substantially to the type disclosed in Patent 2,650,979 issued September 1, 1953, on the application of Edmund E. Teubner and assigned to the assignee of the present application.

The circuit is designed to repetitively store and discharge energy to produce a series of short, time spaced spark discharges across the gap. Each discharge in the capacitative storage system occurs when it is charged to that potential that produces disruptive breakdown of the medium between the spaced tool and workpiece. The ionization of the fluid medium in the spark gap between the electrode tool and the workpiece is ideally maintained only for the few microseconds required to discharge the stored energy to the point where the voltage across the spark gap is insufficient to maintain the ionized spark current path. The capacitative storage system subsequently recharges again to a discharge potential, thus producing a series of time-spaced short spark discharges.

Figure 2:
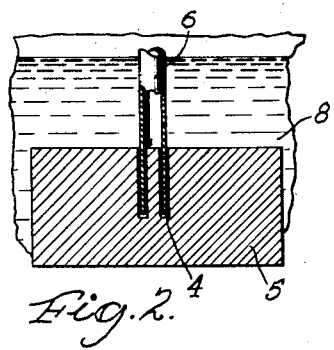
Fig. 2 is a sectional view of the spark gap defined by the workpiece and electrode tool in a spark machining operation.

A typical spark gap as defined between a conductive workpiece, which may be tungsten carbide, and electrode tool, preferably made of brass, in a spark boring operation is shown in Figure 2. It is important that the spark gap be filled with a dielectric liquid 8 such as kerosene, through which an ionized current path is briefly maintained during disruptive breakdown upon sparkover. The voltage required to initiate the discharge increases with increase in the spark gap length, and with kerosene of a given purity or cleanliness the voltage drop required to maintain the ionization during the spark discharge is in the vicinity of 30 volts. Practical spark gap lengths are small, being usually less than a thousandth of an inch with brass cathode tools, and while the discharge peak current may be in the order of thousands of amperes, the discharge duration is usually at most a few hundred microseconds and preferably much less. The liquid dielectric helps provide a controlled spark discharge not only readily initiated at relatively low voltages, but also readily deionized and thus terminated. It also serves non-electrical functions such as conveying the entrained or suspended removed particles from the active spark gap region. As a matter of definition of the kerosene or other fluid selected, it should be understood that the dielectric characteristics are such as to prevent electrolytic conduction of high currents of the order of magnitude required for spark currents and that it has essentially liquid state properties as supplied to the gap.

The dislodging of particles from the conductive workpiece by the spark action, as presently understood by the applicant, is best explained in terms of the electric field force produced by the spark current. Thus with the workpiece at a positive potential with respect to the electrode, the disruptive breakdown of the dielectric between them is the occasion for flow of electronic current to the workpiece. Considering the spark terminus on the surface of the workpiece as an approximate point source of current, the current densities at and just under the surface of the workpiece are very high. Due to the resistivity of the workpiece metal, a substantial electric field gradient along the current path in the workpiece near the surface receiving the spark is produced. This electric field gradient results in a force on the positive ions in the material. These positive ions are the atoms in the crystal lattice of the material less the associated orbital electrons which are free to move and provide the ordinary conduction properties of the material. The electrostatic forces on that volume of workpiece material thus positively charged tend to tear it away from the main body of the workpiece. The rupturing forces must overcome the tensile strength of the workpiece material to dislodge a particle and thus erode or machine the workpiece.

The size of the fragment thus dislodged is limited by the decrease in current density with distance from the point current source on the workpiece surface. Thus, neglecting skin effect, the current density $J_r$ at any distance $r$ from a point current cource on the workpiece surface is:

$$J_r = \frac{I}{2r^2}$$

Assuming a given critical current density, $J_c$, is required for removal of a workpiece fragment of given tensile strength material, the radius of which this current density exists will therefore be:

$$r = \sqrt{\frac{I}{2J_c}}$$

From this equation the radius, taken from the center of the ionized path, of the crater that occasioned the dislodgment of a workpiece fragment is proportional to the square root of the spark current.

The field force on the ions in the lattice of the electrode tool cathode is directed into its surface rather than away from it so that the tool is not subjected to the rupturing forces on the anodic workpiece.

By the same theory the crater depth produced by a spark depends primarily upon the spark current. The time duration of the spark discharge, on the other hand, would seem most effective in increasing the crater area, presumably since the spark terminus on the workpiece may change somewhat due to the changing contour of the workpiece as the spark action proceeds.

Laboratory tests made with carefully controlled, very short discharges of given voltage, yield the following empirical relation which is in accord with the electric field force theory:

$$V = K_v T \cdot I^{3/2}$$

Where V is the volume of a particle crater, $K_v$ is a constant including the relation of the tensile strength of the workpiece, T is the time duration of the current, and I the current. Correspondingly for the depth D of the crater:

$$D = K_d T^{1/3} \cdot I^{1/2}$$

where $K_d$ is a constant corresponding to $K_v$.

Applying these relationships to spark cutting apparatus it is seen that for a given spark duration, the current amplitude determines the amount of material dislodged per spark, and that for a given amount of energy (product of current and duration) effectiveness is increased by increasing the current to time ratio.

The values involved in actual machining practice, as for tungsten carbide, for example, approach those predicted and confirm the analysis. Microscopic examination of the craters left upon particle dislodgement reveals evidence of fracture by mechanical forces. The crater left by a single spark appears to be formed by the progressive removal of several particles or the progressive crumbling of the workpiece material. In accordance with the theory, the softness of a brass cathode electrode compared to a workpiece anode such as tungsten carbide does not affect the spark machining since it depends upon the electrical energy of the spark discharges and no physical contact whatsoever is made by the electrode with the workpiece. The total material removal is, of course, the cumulative effect of a number of discharges and hence the repetition rate is directly involved in actual practice.

Referring again to Fig. 1 a further explanation of the charging circuit is presented here for an appreciation of the significance and function of the physical embodiment of the discharge circuit.

As shown the direct current power supply 1 may suitably comprise a step-up transformer 9 having an adjustable tap primary winding connected to any single-phase alternating supply voltage source 10, such as the usually conveniently available 115 volt 60-cycle line. The ends of the secondary winding are connected to the anodes of a pair of rectifying discharge devices 11 whose cathodes are connected in parallel to the positive line 12. The center tap of the secondary winding is connected to the grounded negative line 13. A filter network is preferably provided to reduce the voltage ripple of the rectified pulses and improve the voltage regulation. Such a filter may suitably comprise two input chokes or inductive reactors 14 and 15 in series in the positive line with by-pass capacitors 16 and 17 connected across the lines following each choke. A conventional bleeder resistor 18 is connected across the second capacitor 17. For installations of a size involving high average currents, other direct current power supplies than a single phase full-wave rectifier may be advantageously substituted, and the filter network may be modified or omitted as dictated by economic considerations.

The charging network 2 for the capacitor 3 is designed to permit rapid recharging of the capacitor from the power supply 1 following initiation of the discharge of the capacitor stored energy in the spark gap discharge circuit. To that end resistance and inductance are supplied to the discharge circuit suitably in the form of a charging inductor 19 and charging resistor 20 in the positive line. The time constant of the resistor-capacitor combination plays only a partial role in determining the charging time of the capacitor, in view of the inductance. Thus, during the spark discharge enough resistance is usually required to limit the current flow directly from the power supply through the spark gap, and allow an initiated spark discharge to deionize rather than to degenerate into a heating arc. At the same time the resistance increases the charging period and hence lowers the spark repetition rate. However, when the capacitor 3 discharges the instantaneous change of current flow through the inductor 19 is delayed because of its self-inductance. The stored inductive energy is not released until after deionization of the spark discharge, thus permitting a significantly lower resistance value of the resistor 20 to be employed than in the charging inductance were absent. The very delay in beginning recharging permits a much lower time constant and the charging rate is also subsequently increased by the return of the stored inductive energy to the charging circuit. This charging means is more fully described and claimed in the copending application by Edmund E. Teubner, Serial No. 202,361 filed December 22, 1950, and assigned to the assignee of the present invention.

Figure 3:
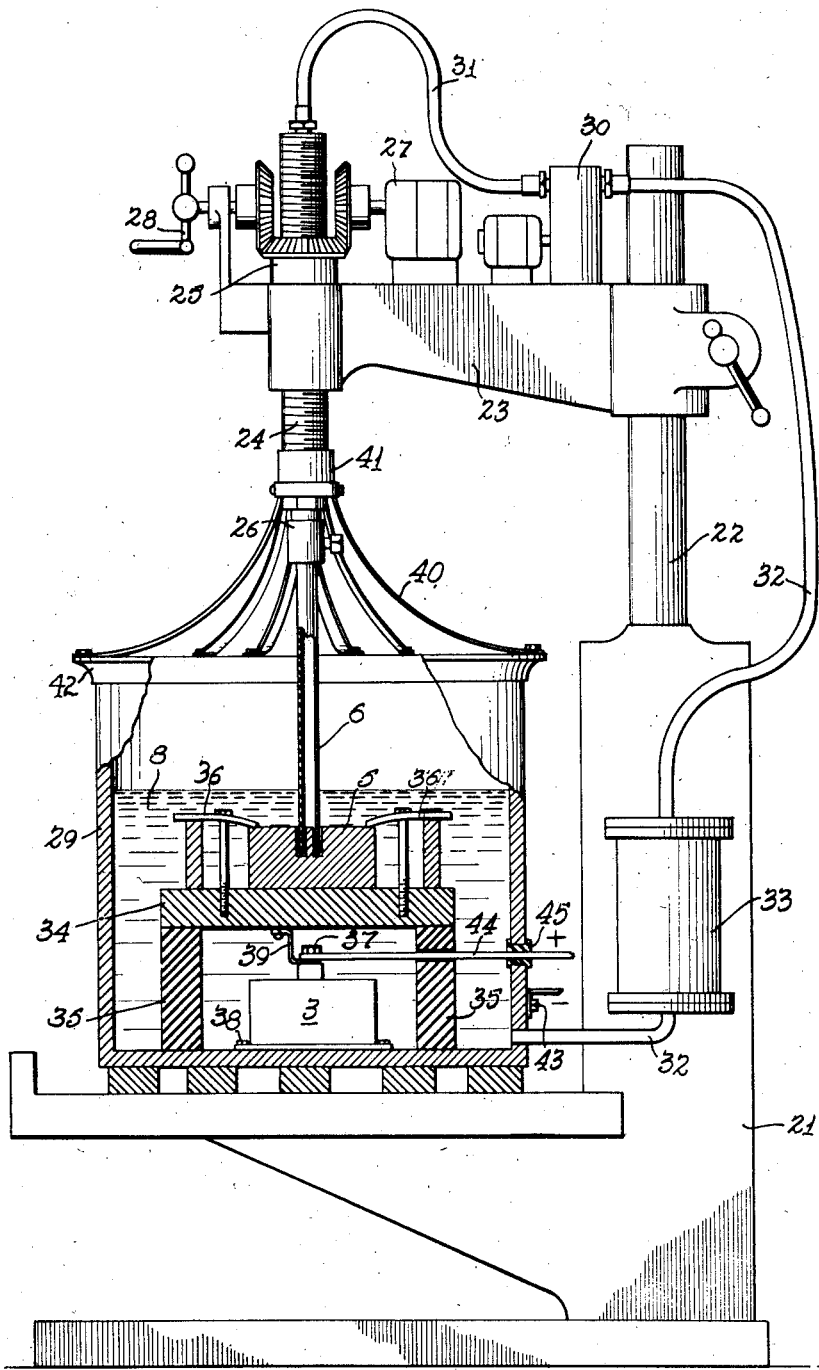
Fig. 3 is a side elevation showing the mechanical arrangement of apparatus suitably utilizing the discharge circuit of Fig. 1 and including the physical arrangement of the work tank circuit.

The mechanical arrangement of the spark machining apparatus together with a preferred physical arrangement of the discharge circuit components in a work tank is indicated in Fig. 3.

The machine frame is suitably somewhat similar to a drill press, having a pedestal base 21 and an upright support column 22 with a vertically positionable radial support arm or platform 23 thereon on which is mounted the power transfer mechanism of the feed system 7. An electrode 6 supported from the end of the radial arm 23 is raised or lowered with respect to the workpiece 5 below for a spark machining operation analogous to drilling. A vertical screw shaft 24 has an upper end portion threaded in a rotatable sleeve 25 journaled in the radial arm 23 and a chuck 26 on the lower end of the shaft to hold the electrode tool. The screw sleeve 25 is rotated by a feed motor 27 to slowly lower the shaft and electrode tool and maintain the desired spark gap spacing as the workpiece is eroded away. A manual adjustment control 28 geared to the sleeve 25 is also provided. This feed control is only illustrative, and additional feed rate control means, including servomechanisms, for example, may be substituted, depending upon the requirements of the installation.

A work tank 29 mounted on the pedestal base 21 below the vertical shaft 24 is employed to hold the workpiece in a bath of kerosene or other liquid dielectric as is required for the spark machining operation. Since a major problem is removal of the particles or chips from the spark gap, the electrode tool 6 in this case is hollow, as is the screw shaft 24, in order that the kerosene and entrained particles may be pumped out of the gap and up through the tool itself. A pump 30, mounted on the arm 23 and having an intake line 31 coupled to the upper end of the shaft 24, suitably provides this function. The kerosene is returned to the tank through a return line 32 which includes a filter 33 for cleaning the kerosene. Means for draining or storing the liquid may also be employed as desired to facilitate positioning of the workpiece in the tank. The tank or container size and shape may be varied to fit the requirements of the workpiece so long as the spark gap is inundated in the dielectric liquid during sparking.

Considering now the discharge circuit, that is, the circuit loop of the capacitor 3 and spark gap 4, I have found that its inductance is a limiting factor in two respects. One is that the peak current of the spark is limited since inductive reactance is presented to the rapid current change. The other is that oscillation of the current of the spark is caused. This is undesirable since undirectional electron flow across the gap into the anodic workpiece is sought, and since oscillation delays the deionizing of the gap and the recharging of the capacitor. In accordance with my invention I have found that elimination of lumped inductance components is insufficient and that the inherent inductance of the discharge circuit must be reduced as far as possible. Thus, by reducing the normal inductance of the discharge conductors, the transient or resonant response frequency is increased and the damping increased. While the values of inductance involved are very small, its reduction is significant both in increasing the ratio of current to time in the first half cycle of spark current and the discharge repetition rate.

In accordance with one aspect of my invention as shown in Figure 3, the work tank 29 serves as part of a low inductance discharge circuit for the capacitor 3. Accordingly the work tank is preferably made of conductive material, such as copper, or made of steel having an inner copper liner. In the example illustrated, the workpiece 5 is set up on a base plate 34 suitably made of copper and insulatingly supported from the floor of the tank by insulating support legs 35. The workpiece is also insulatingly spaced from the tank walls, but the tank diameter is small enough so that the walls are relatively close to the spark gap circuit components. Dogs or clamps 36 of a suitable nature and size are provided to fasten the workpiece 5 on top of the base plate 34 and in good conducting contact therewith. The capacitor 3 may suitably take the form of a high voltage oil filled capacitor having a metal casing which serves as one of the electrodes and an insulating bushing on the upper end of the casing through which an upright terminal stud 37 is sealingly supported. With this type of capacitor construction, the capacitor is placed under the workpiece in conductive connection to the work tank by contact of the under side of its casing with the inner bottom surface of the tank, but other capacitor types may be employed and connected in place. The capacitor is preferably bolted in place to prevent the possibility of an arcing contact by bolts through bottom capacitor casing lugs or ears 38. A flexible conducting strap 39 suitably made of copper cable is connected between the upright terminal 37 and the lower surface of the workpiece base 34 so as to effectively place that capacitor terminal in conductive relation with the workpiece 5 itself.

While capacitor units of different values may be employed or substituted as desired, as is convenient, a number of capacitor units may be positioned in the work tank and connected in series or parallel between the tank and workpiece to provide the desired capacitance or voltage rating.

The connection of the other terminal of the capacitor 3 to the electrode tool 6 is provided by at least one flexible conductor 40 between the top of the work tank and the conductive electrode tool holder. In the construction shown, a plurality of such flexible conductive straps are connected from a collar 41 conductively supported on the electrode tool holder to uniformly spaced regions on fastening flange 42 on the work tank rim. The flexible straps in effect close the tank top to define a very low surge impedance, essentially coaxial transmission line connection between the capacitor, the workpiece and electrode tool through the tank itself. By thus using the work tank itself as the outer conductor in the discharge circuit and eliminating all discharge conductors outside the work tank, the discharge circuit inductance is reduced to a fraction of what it would be if the receptacle 24 or its equivalent were omitted. The magnetic field is confined between the inner and outer conductors so defined and hence strong coupling is avoided. This shielding action also minimizes the opportunities for increase in inductance due to magnetic materials in proximity to the discharge circuit. The tank, or at least its inner surface, is non-magnetic, and magnetic coupling to the tank is also minimized. While the work tank may take various configurations, the reduction of inductance associated with coaxial lines is substantially retained insofar as the outer conductor or work tank carrying current in one direction surrounds the inner conductor or spark gap and associated circuit carrying current in the other direction. The form of capacitor, or indeed of any discharge current source, is not critical so long as it can be coupled into the enclosed circuit.

While the advantages of short lead length, and to that extent, lowered inductance, permitted by use of the work tank as a conductor are still retained by using, for example, only one conductive strap 40 between the electrode tool holder and the tank top, the electromagnetic shielding and that reduction of inductance due to the confining of the magnetic field in the work tank is forfeited. Accordingly, it is preferable that a plurality of conductors 40 be used so as to in effect cover the tank so far as shielding is concerned. The shielding action is not substantially affected by the raising and lowering the electrode tool, there being enough slack provided in the flexible straps to accommodate the degree of motion desired. If the electrode tool is also to be given a rotary motion as may be desired for such machining operations as thread cutting, the collar 41 to which the upper ends of the straps 40 are connected is preferably made rotatable on the shaft 24, from which the electrode tool 6 is supported. In order to afford good conductive connection between the sliding collar and the machine shaft, the collar may be shaped to provide a hollow annular chamber surrounding the shaft and containing mercury. For a more complete description of such a mercury contacting apparatus, reference is made to a copending patent application by Cecil P. Porterfield, Serial No. 402,675, filed January 7, 1954, and assigned to the assignee of the present invention, in which similar means are disclosed and claimed.

Charging circuit connections are suitably provided for the capacitor 3 in the work tank 29. As shown the negative or ground conductor may be connected to a lug 43 conductively secured as by bolting or welding to the work tank 29 and a positive conductor 44 is insulatingly sealed through the work tank wall at 45 to the stud 37 comprising the positive capacitor electrode which is insulated from the capacitor casing and work tank. These leads are, of course, subject to, or more likely to have, a noticeable inductance according to their length and the manner in which they are disposed. A chassis or cabinet (not shown) containing the elements of the charging circuit is preferably positioned on the machine column or placed near to it. It is to be understood that since the inductance in the particular charging circuit described is required, the value of the inductor 19 may be chosen with the value of inductance provided by the leads in mind so that the total inductance does not exceed the desired amount. As good practice, however, it is desirable that the charging leads be short to keep the inductance fairly low and thus minimize the significance of compensation or variations in compensation to be made for lead inductance.

Figure 4:
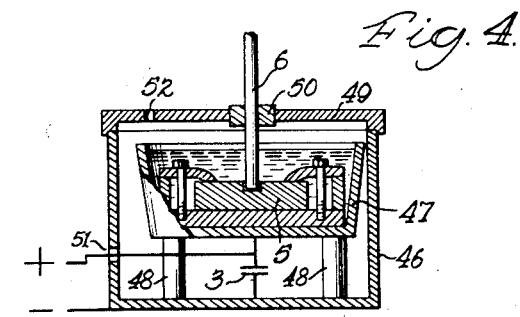
Fig. 4 is a simplified representation of a modified work tank and work tank circuit.

Referring now to Fig. 4, a modification of the low inductance work tank circuit is shown therein, a capacitor 3 being schematically illustrated for the sake of simplicity. A closed conductive non-magnetic work tank enclosure 46 is provided. Within the tank 46 is an open tray or inner tank 47 also made of a conductive metal. The container 47 is supported by insulating spacers 48 from the bottom of the enclosing tank 46. The workpiece 5 is suitably clamped in place within the tray 47 in conductive relation to it and the capacitor 3 is connected between the tray and the work tank, being shown near the center of the tank between its bottom surface and under the tray. The tank 46 is closed at the top by a removable conductive cover 49 having a center conductive contacting bushing 50 through which the electrode tool 6 is admitted. Connections are suitably made to the capacitor 3 from a charging circuit, the outer tank 46 being the negative terminal and a positive lead extending through an aperture 51 in the outer tank wall. The spark gap is maintained by sliding the electrode 6 through the top bushing, the working end of the electrode and the facing work surface to be machined being submerged by the kerosene or other dielectric in the inner container or tray 41. A vent opening 52 in the cover is desirable if the tank 46 is otherwise sealed to permit escape of gases from decomposition of the kerosene.

With the construction exemplified by Fig. 4, a more complete enclosure of the discharge circuit is obtained, since the outer tank 46 is closed entirely around the capacitor 3. By such means the peak spark current is increased and oscillation further damped. The tank cover 49 in this case also provides a mechanical means to shield the operator from spattering of the dielectric fluid caused by its turbulence at high cutting rates. The use of the separate inner tray 41 to confine the dielectric medium may be eliminated if it is desired to use the single enclosure for confining both the liquid and the magnetic fields of the discharge circuit. Placing of the capacitor in the liquid dielectric also cools the capacitor and makes it possible to use a lower rate or smaller physical size capacitor for a given average current.

Figure 5:
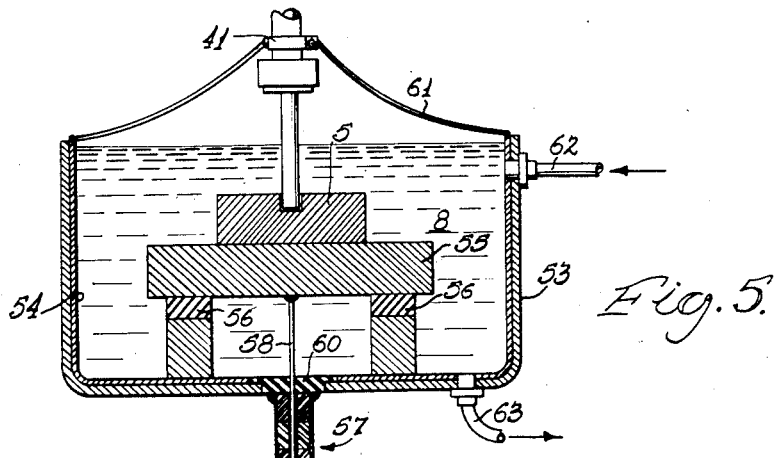
Fig. 5 is a simplified representation of another modified work tank and work tank circuit.

Another modified work tank discharge circuit construction is illustrated in Figure 5 where the size of the capacitor 3 is large relative to the work tank 53, or it is otherwise impractical for the work tank to physically encompass the capacitor or capacitors. It should be noted that while the voltage to which the capacitor is charged may be only in the order of a hundred volts and the capacitance itself only a few microfarads, the physical size of the capacitor may be relatively large because of the high current rates of change required which correspond to those of sinusoidal frequencies very many times higher than the spark repetition rate. Referring still to Figure 5 the work tank 53 may suitably have a non-magnetic inner liner 54 made of more highly conductive material than the tank itself. The workpiece 5 is conductively secured to a base plate 55 which is insulatingly supported from the work tank by means including insulating spacer 56.

Referring still to Fig. 5, the capacitor 3 below the work tank is connected to it by a coaxial transmission line section 57, the line suitably having an inner conductor 58 carrying insulating spacer beads surrounded by a flexible outer conductor 59. The inner conductor 58 extends through an aperture in the work tank and is connected to the base plate 55. The other end of the inner conductor 58 is connected to the positive terminal of the capacitor 3. The outer conductor 59 has one end connected as by soldering or welding to the work tank around the aperture for the inner conductor and has its other end connected to the negative terminal of the capacitor 3. The capacitor 3 is suitably charged through a charging circuit such as previously described. A sealing washer 60 in the work tank aperture prevents escape or leakage of the dielectric liquid into the coaxial transmission line section. The discharge circuit from the work tank to the electrode tool 6 is completed by means such as those described in relation to either Figure 3 or Figure 4, a pair of conductive straps 61 being indicated in the drawing. Inlet and outlet tubing sections 62 and 63 are also shown as illustrative of a manner in which the dielectric liquid may be circulated.

The transmission line section 57 shields that part of the circuit from the effect of magnetic materials or external circuits which might otherwise be coupled through the magnetic fields associated with the discharge circuit to increase its inductance. In effect, the outer conductor 59 in the transmission line section is an extension of the conductive work tank surrounding the inner lead to the capacitor. The advantages of the work tank as a current-carrying conductor surrounding the effective inner conductor carrying discharge current in the opposite direction are retained.

Figure 6:
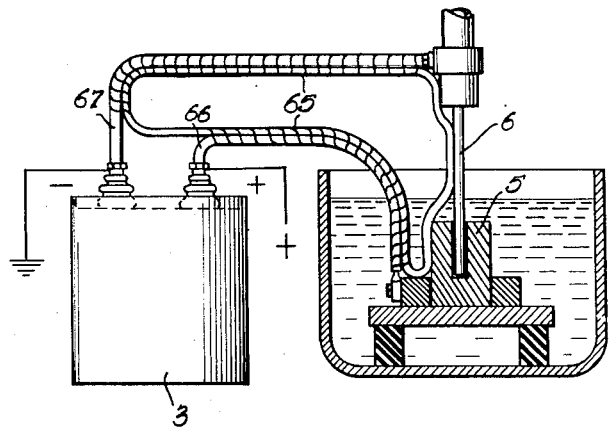
Fig. 6 is a representation of a discharge circuit and apparatus embodied in my invention and particularly disclosing a coupled closed loop for minimizing inductance.

Another manner of arranging the discharge circuit conductors for minimum inductance when the capacitor 3 for various reasons is not to be included in the work tank is indicated in Fig. 6. In this case a closed conductive loop 65 is arranged to couple the magnetic field produced by the loop of the discharge circuit itself. It is to be appreciated, of course that while no lumped inductance is present, some inherent or distributed inductance is necessarily involved by reason of the area enclosed by the circuit through which current flows when the spark gap discharge occurs. Thus with a conductor 66 between the positive terminal of the capacitor 3 and the workpiece 5 and a conductor 67 between the negative terminal of the capacitor 3 and the electrode tool 6, the loop thus defined has inductance to the extent that spacing between conductors 66 and 67 is involved. Inasmuch as the spark gap and capacitor components have a material physical size, the self-inductance of the circuit is significant in spark machining.

As indicated further in Figure 6, the conductor forming the short circuited loop 65 is formed to follow the contour of most of all of the discharge circuit conducting path and to be closely adjacent the conductors 66 and 67 so as to enclose substantially the same area. The loop conductor is suitably insulated as by an insulating tape and suitably bound to the discharge conductors by tape or string. Since most, if not nearly all, of the magnetic field passing through the discharge loop which generates it will also pass through the closed loop 65, the energy coupled by the loop 65 is dissipated as an I²R heat loss therein to thus effectively counteract or cancel discharge loop inductance. A similar effect is that of a transformer whose primary input inductance is reduced by short circuiting or heavy loading of its secondary winding.

While the coefficient of coupling K as defined in the usual manner may range from .1 under only partial coupling conditions to about .9 with favorable circuit arrangements, the higher degree of coupling is, of course, preferable. The conductor of the loop 65 will have some resistance, but would normally have less than .005 ohm resistance for the length of the conductor. This value may be considered as equivalent to a short circuit so far as inductance reduction for effective damping is concerned.

Figure 7:
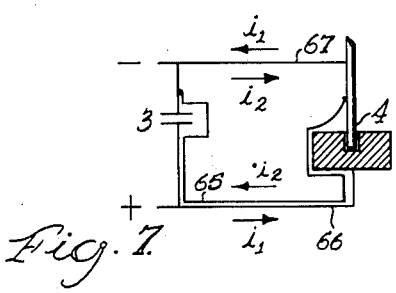
Fig. 7 is a schematic diagram showing a modification of the coupled closed loop of Fig. 6.
Figure 8:
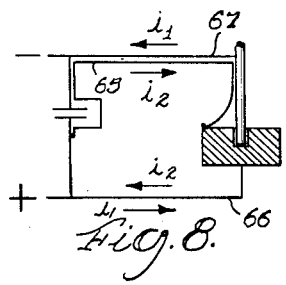
Fig. 8 is a schematic diagram showing another modification of the coupled closed loop of Fig. 6.

While the closed or short circuited loop 65 is shown as insulated, it is still effectively isolated if it makes contact with the discharge circuit so long as the contact does not provide a conductive path around the capacitor 3 or across the spark gap 4. Figures 7 and 8 illustrate the requirements. In these schematic representations of the discharge circuit and the closed or short circuiting loop the direction of the discharge current of the spark in the discharge circuit is indicated by the arrows $i_1$. The reverse induced current in the loop 65 or effective secondary winding is indicated by the arrows $i_2$. If the closed loop 65 merges with or is in contact with the primary loop along its negative line between the negative terminal of the capacitor and the spark gap, as indicated by Fig. 7, or along its positive line between the positive terminal of the capacitor and the spark gap, as indicated in Figure 8, the inductance canceling action remains the same as if a fully insulated closed loop 65 were employed. The net effect in the part of the circuit carrying both the discharge current and the reverse induced current is to simply decrease the net flow of current in that portion only of the discharge circuit.

Figure 9:
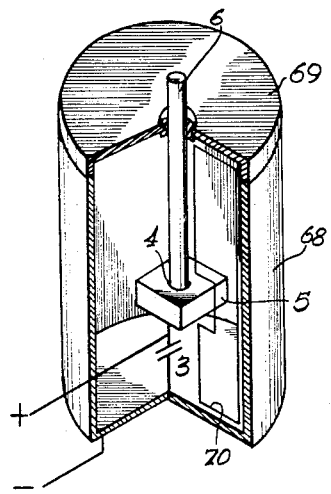
Fig. 9 is a view of a work tank together with both a coupled closed loop and a low inductance capacitor circuit.

In Fig. 9 a combination of the closed loop and coaxial work tank discharge circuit is indicated in semi-schematic form. Thus a conductive work tank 68 provided with a top cover 69 is shown as the outer conductor surrounding an inner conductor including the spark gap 4 and the capacitor 3. The capacitor is schematically indicated between the workpiece 5 and the bottom of the work tank, being suitably connected to a charging circuit in the manner indicated with respect to embodiment of Fig. 3. In addition a short circuited or closed loop 70 is provided within the work tank. This loop may suitably take the form of the insulated conductor 65 shown in Fig. 6. The loop lies in a radial plane, extending vertically along the inside wall of the tank, along the top and bottom, and vertically near the center vertical axis of the tank along the spark gap 4 and the capacitor 3. In view of the coaxial nature of the work tank discharge circuit substantially all of the magnetic flux of the discharge circuit is coupled by the loop 70. This may be seen to follow since the flux induced magnetic field is directed circularly around the effective inner conductor. In cases where the work tank is especially large, the inductance-cancelling effect of the loop 70 may prove especially useful in further reducing the total inductance of the discharge circuit.

Since currents may be induced along closed paths in a conducting sheet or block having a region normal to the direction of the induced field, the closed loop need not be restricted in form to a loop outline. A modification of the closed loop 70, Figure 9, is accordingly shown in Figure 10 to demonstrate one embodiment. Here again the capacitor 3 is positioned in a work tank 71 between its bottom end and the workpiece 5, the electrode tool 6 extending from the top of the work tank to define the spark gap 4 in cooperation with the workpiece. In this instance, by way of example, the capacitor 3 is shown in a tubular form, aligned with the vertical center axis of the tank. The lower end 72 of the upright tube is the negative terminal of the capacitor and in conductive relationship with the tank, and the upper end 73 of the tubular capacitor is connected to the workpiece. The positive and negative terminals of the charging circuit are connected to the capacitor in the manner previously described.

Figure 10:
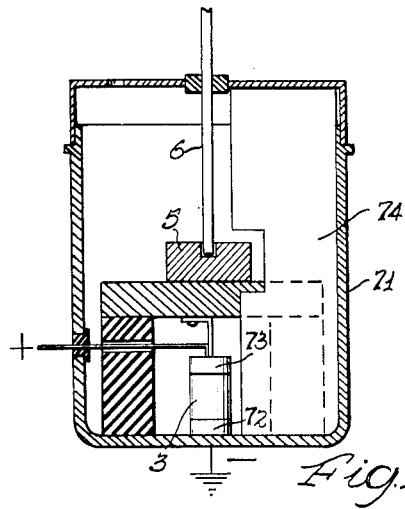
Fig. 10 is a view of a work tank arrangement similar to that of Fig. 9 but having a modified coupled closed loop structure.

The closed or short circuited-loop, of Fig. 10, preferably takes the form of a radially aligned conductive fin 74, suitably made of copper sheet. This fin is positioned between the top and bottom of the work tank and suitably has its outermost edge in conductive relationship with the side wall of the tank while the inner radial edge of the member 74 is spaced from the capacitor and spark gap, it being essential that it does not short either of them so as to maintain its effective electrical isolation or insulation from the discharge circuit. Again, as in the modification described with respect to Figure 9, the circular direction of the magnetic flux within the work tank induces reverse currents in the fin 74. In this case, despite the fact that the loop is effectively closed in by reason of its being a solid conductive sheet, a multiplicity of closed induced current paths are established. The shorter apparent discharge current path along the inner edge of the fin 74 does not cancel the effectiveness of the fin since the coaxial conductor arrangement of the discharge circuit essentially determines the discharge current distribution and the magnetic flux pattern.

Summarizing briefly the improved discharge circuit arrangements, it is apparent that the inherent or distributed inductance is reduced by a conductor arrangement which distributes the current from the energy impulse source through the spark gap so that the magnetic fields produced by the current impulses have a minimized inductive effect. Thus by utilizing the work tank as a hollow conductor carrying current in the opposite direction from the remainder of the circuit it surrounds, the self-inductance is reduced for a given conductor spacing. By employing a closed circuit magnetically coupled to the discharge circuit, the self-inductance is also reduced. As a result, the peak current is increased, and the duration of the initial current impulse reduced and the oscillation of the spark current is also damped more rapidly to permit more rapid recharging and hence faster repetition rates.

I claim as my invention:

1. Apparatus for electrically eroding a workpiece, said apparatus including means for supporting said workpiece, an electrode, means for supporting and controllably moving said electrode toward said workpiece to maintain a predetermined gap therebetween, a condenser, a charging circuit connecting said condenser to a source of current, a discharge circuit connecting said condenser to said workpiece and said electrode, and a low-inductive conductor connected in series in said discharge circuit and having a form adapting it, in the presence of current in the inductance of the discharge circuit whereby the peak discharge current is greatly increased and its duration is greatly reduced.

2. The structure recited in claim 1 and a further conductor magnetically coupled with, but electrically insulated from said discharge circuit for neutralizing a portion of the magnetic field linking said discharge circuit by the induced current in the added conductor, further to reduce the effective inductance in said discharge circuit.

3. The structure recited in claim 1 in which said electrical conductor is in the nature of a receptacle enclosing said discharge circuit.

4. The structure recited in claim 3 in which the wall of said receptacle is relatively close to the component parts of said discharge circuit.

5. The structure recited in claim 3 in which said receptacle electrically connects said condenser to said electrode.

6. The structure recited in claim 3 and a short circuited loop formed of an electrical conductor and disposed within said receptacle, said loop being magnetically coupled with, but electrically insulated from said discharge circuit.

7. In an apparatus for electrically dislodging particles from a workpiece by passing a succession of electric spark discharges across a dielectric-filled spark gap between the workpiece and an electrode tool, the combination comprising a conductive work tank for holding a dielectric liquid, means for insulatingly supporting the workpiece in said tank, means for lowering the electrode tool relative to the workpiece to define the spark gap therebetween, means for connecting a source of electrical impulses between said tank and a workpiece in said tank, and low inductance means for completing the discharge circuit conductively connecting the electrode tool to the top portion of the tank.

8. In apparatus for electrically eroding a workpiece having a spark gap defined between an electrode tool and the workpiece, a source of electrical impulses, conductive means connecting said spark gap and said source in a series circuit, said conductive means being arranged to include a hollow conductive portion of said circuit surrounding an inner conductive portion including the spark gap.

9. In apparatus for electrically eroding a workpiece having a spark gap defined between an electrode tool and the workpiece, a source of electrical impulses, conductive means connecting said spark gap and said source in a closed circuit, said conductive means including means for reducing the magnetic field induced by a current impulse from said source whereby said circuit inductance is reduced.

10. In apparatus for electrically eroding a workpiece by spark discharges, a low inductance discharge circuit comprising a spark gap structure defined by an electrode tool closely spaced with respect to said workpiece, a localized impulse voltage source, a substantially closed hollow conductive body surrounding said source and said gap structure, and means connecting said source and said spark gap structure in series circuit between opposite sides of said body to complete the discharge circuit therethrough.

11. Apparatus for electrically eroding a workpiece, said apparatus comprising an electrode, a charging circuit having a condenser connected across the terminals of a source of direct current, a discharge circuit in which the condenser is connected across the gap between the electrode and workpiece with its positive terminal connected to the workpiece and its negative terminal connected to the electrode, means for decreasing the gap between the electrode and the workpiece, and an electrically conducting closed loop magnetically coupled with but electrically insulated from the discharge circuit.

12. Apparatus according to claim 11, in which said closed loop has a coefficient of coupling between about 0.1 and about 0.9.

13. Apparatus for electrically eroding a workpiece according to claim 12, in which said closed loop has a substantially negligible resistance and a substantially negligible leakage conductance with the discharge circuit.

14. An apparatus for electrically dislodging particles from a workpiece by a succession of electrical spark discharges caused to pass between the workpiece and an electrode spaced therefrom by a dielectric filled spark gap, said apparatus comprising, in combination, means for holding the workpiece, an electrode spaced from the workpiece by a spark gap, energy storage means including a condenser, a charging circuit connecting said condenser for repetitive charging from a source of electric power, discharging circuit conductors connecting said condenser to the workpiece and to said electrode for the application of a series of time-spaced spark discharges across the spark gap, means for adjusting the size of the spark gap, and a low resistance closed circuit having the conductors thereof adjacent said discharging circuit conductors for minimizing inductance in said discharge circuit whereby each such spark discharge has a substantially higher peak current of substantially shorter duration than would be obtained in the absence of said last recited means.

15. In an apparatus for machining a workpiece by the electrical dislodgment of particles therefrom, the combination of means for holding the workpiece, an electrode tool disposable in spaced relation with the workpiece with a dielectric filled spark gap situated therebetween, means for applying a series of time-spaced electrical spark discharges across the spark gap between the tool and the workpiece, and closed circuit means magnetically coupled with the inherent inductance of said discharge applying means for increasing the peak current and shortening the duration of each such spark discharge.

16. A method of machining a workpiece by electrical dislodgment of particles therefrom, said method comprising the steps of holding the workpiece, bringing an electrode tool into spaced relation with the workpiece so as to define a spark gap therebetween, maintaining the spark gap filled with dielectric fluid, applying by means of an electric circuit a series of time-spaced electrical spark discharges across the spark gap between the tool and the workpiece, and controlling the peak current and duration of each such spark discharge by controlling the inherent inductance of the discharge applying circuit.

17. The method of removing material from a workpiece by electrical dislodgment of particles therefrom, said method comprising the steps of holding the workpiece, bringing an electrode tool into spaced relation with the workpiece so as to define a spark gap therebetween, maintaining the spark gap filled with dielectric fluid, applying by means of an electric circuit a series of time-spaced electrical spark discharges across the spark gap between said tool and the workpiece, the tool being cathodic and the workpiece being anodic, and increasing the peak current and shortening the duration of each such spark discharge by the use of a short-circuited conductor of negligible resistance magnetically coupled to but at least partially electrically isolated from the discharge applying circuit.

18. In an apparatus for electrically dislodging particles from a workpiece by means of a succession of electrical spark discharges passed between the workpiece and an electrode spaced therefrom by a spark gap filled with a liquid dielectric, the combination comprising a grounded conductive receptacle for containing the dielectric liquid and an insulating support means for the workpiece, an electrode spaced from the workpiece to define the spark gap, means for moving the electrode relative to the workpiece to maintain a predetermined spark gap length as the dislodging of particles proceeds, an energy storage means in the receptacle connected between said receptacle and said workpiece, a charging circuit connecting said storage means for repetitive charging from a source of electric power, and means for connecting said receptacle to said relatively movable electrode to complete a low inductance discharge circuit from said storage means through said spark gap.

19. In an apparatus for electrically dislodging particles from a workpiece by passing a succession of electric spark discharges across a dielectric-filled spark gap between the workpiece and an electrode tool, the combination comprising a conductive work tank for holding a dielectric liquid, means for insulatingly supporting the workpiece in said tank, a tool holder for lowering the electrode tool relative to the workpiece to define the spark gap therebetween, means for connecting a source of electrical impulses between said tank and a workpiece in said tank, and low inductance means for completing the discharge circuit including a plurality of flexible conductors connected between the electrode tool holder and spaced points around the top portion of the tank.

References Cited in the file of this patent

UNITED STATES PATENTS

| | | |
|---|---|---|
| 409,015 | Coffin | Aug. 13, 1889 |
| 2,526,423 | Rudorff | Oct. 17, 1950 |

FOREIGN PATENTS

| | | |
|---|---|---|
| 637,793 | Great Britain | May 24, 1950 |